Figure 1:
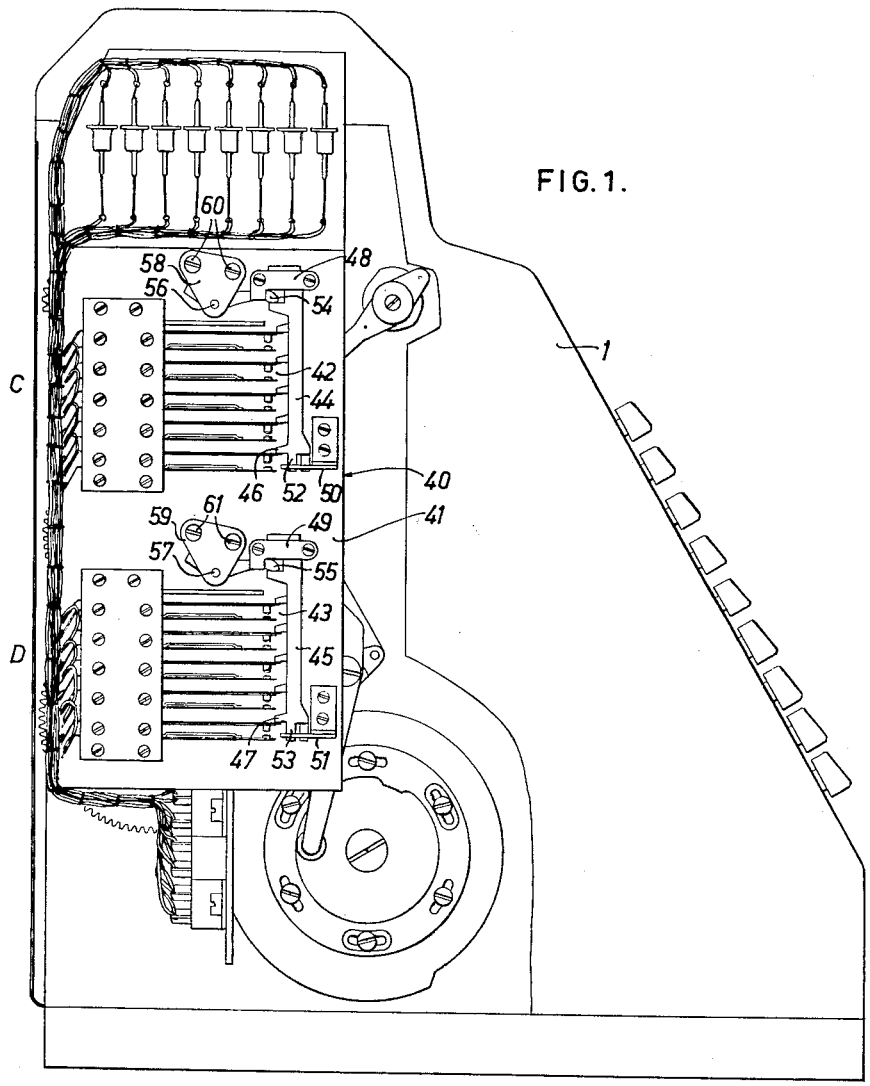

June 6, 1961  G. R. ENGLUND  2,987,247
MEANS FOR CONTINUOUS DELIVERY OF DATA FROM CASH
REGISTERS, ACCOUNTING AND LIKE MACHINES
Filed Jan. 13, 1958  6 Sheets-Sheet 4

Inventor
Gösta Roland Englund
by Sommers & Young
Attorneys

United States Patent Office 2,987,247
Patented June 6, 1961

2,987,247
MEANS FOR CONTINUOUS DELIVERY OF DATA FROM CASH REGISTERS, ACCOUNTING AND LIKE MACHINES
Gösta Roland Englund, Bromma, near Stockholm, Sweden, assignor to Svenska Dataregister Aktiebolaget, Solna, Sweden
Filed Jan. 13, 1958, Ser. No. 708,694
Claims priority, application Sweden Oct. 23, 1957
8 Claims. (Cl. 235—61)

The present invention relates to means for effecting a continuous delivery of data from a cash register, an accounting or a similar machine, and has special reference to means for delivering such data, for instance, as combinations or perforations of a record strip to be then subjected to further treatment or used for analyzing the dates recorded therein.

It is already known for delivering data from, say, a cash register to provide in each decade of the register in connection with the setting elements thereof, a contact for each set position from 0 to, inclusive, 9 and a trip selecter which after the data setting operations are completed acts to connect the respective decades into circuit in succession so as thereby to withdraw the data from the various decades of the cash register by successive pulses. Thus, the pulses resulting are emitted according to the decimal system, which requires a cable for each value from 0 to 9, and they cannot be used for controlling recording apparatus based, for instance, on the principle of punching perforations in a record strip according to a binary code system. In such cases means, as for instance, a diode matrix, must be used for translating the pulses of the decimal system to pulses of a binary code system. It is thus seen that for emitting the pulses in the known way there are required ten (10) contacts for each setting element of each decade and, in addition, ten (10) contacts must be provided in the trip selector. This means that a standard type of cash register requires, for the delivery of data, in addition to periodically operating contacts for controlling the data recording mechanism, one hundred and ten (110) contacts together with means for effecting translation of the pulses from the decimal system to a binary code system which renders the construction very complicated and may give rise to sources of errors.

An object of the invention is to provide a data emitting system which does not require any contacts provided in direct connection with the mechanical setting elements of the register decades.

Another object of the invention is to provide a data emitting system including a simple electric system which may be located well separated from the cash register proper or the other machine under consideration. Hereinafter, for the sake of simplicity, such machine is referred to as a "cash register" or merely "register."

According to an object of the invention the data set in the cash register are translated to the desired code by mechanical means and, likewise, mechanically transmitted to means for controlling contacts belonging to a number of channels for emitting data signals to a data recording apparatus. The contact system required in accordance with the invention comprises in addition to the periodically operating contacts for controlling the driving of the recording apparatus, a single data emitting contact only for each channel. The number of such channels depends on the character of the emission, which may take place either according to the decimal system or according to any desired code. In the embodiment of the invention to be hereinafter described in detail there are five channels only, four of which are used for emitting data signals according to a binary code, while the fifth is used for emitting a so called "odd control" signal.

In the accompanying drawings said embodiment is illustrated by way of detail views.

Figure 2:
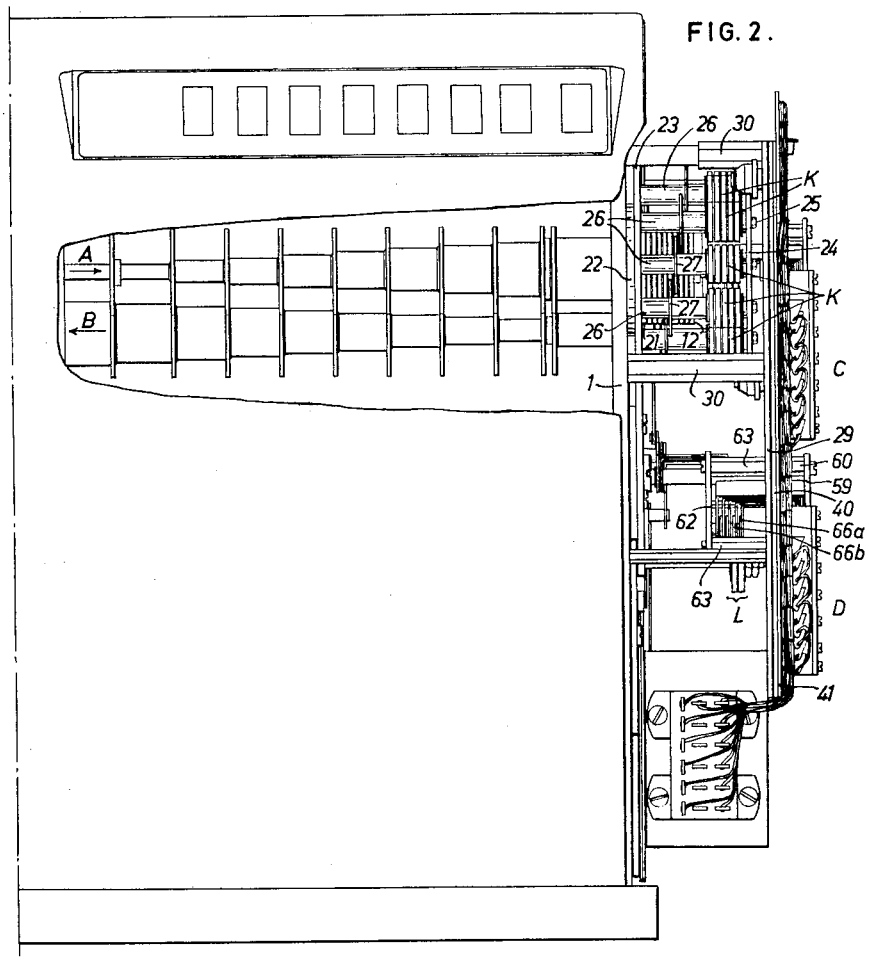
Figure 3:
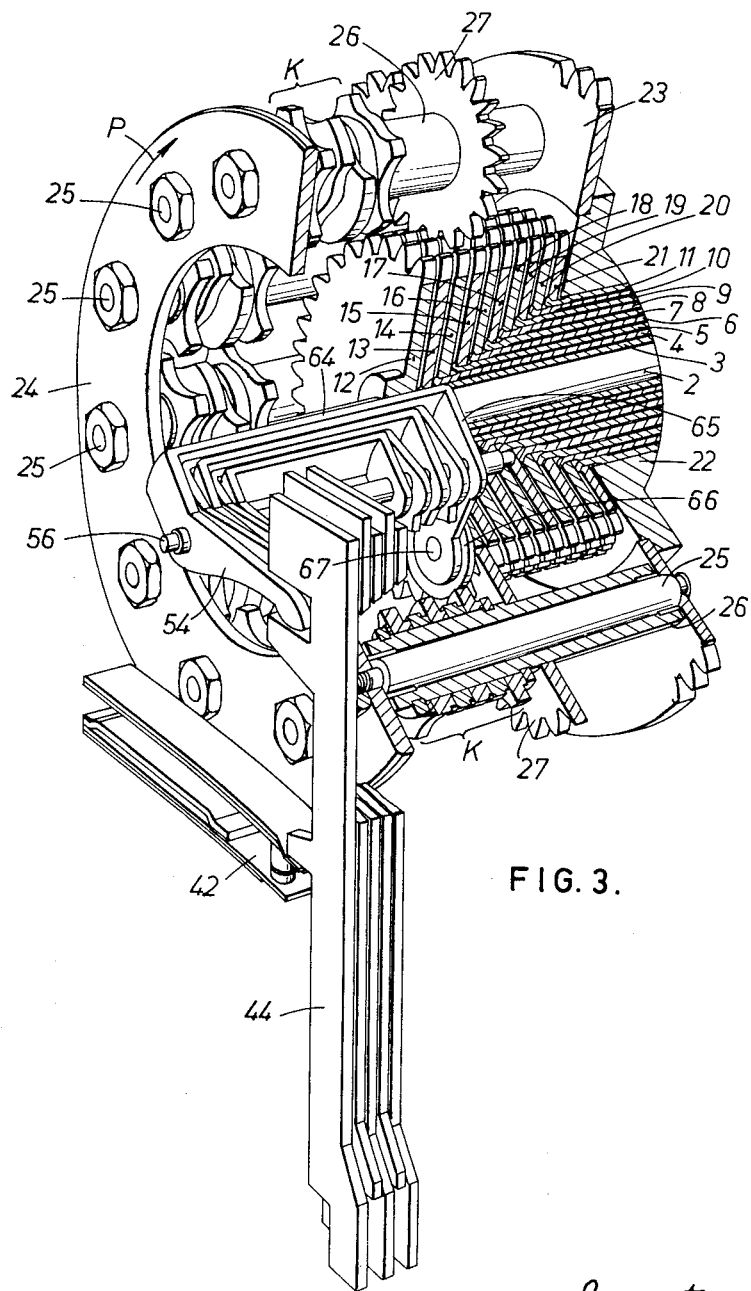
Figure 4:
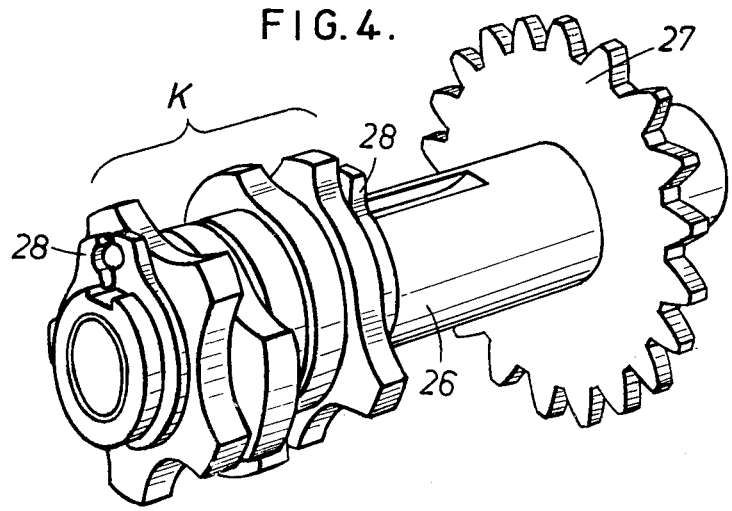
Figure 5:
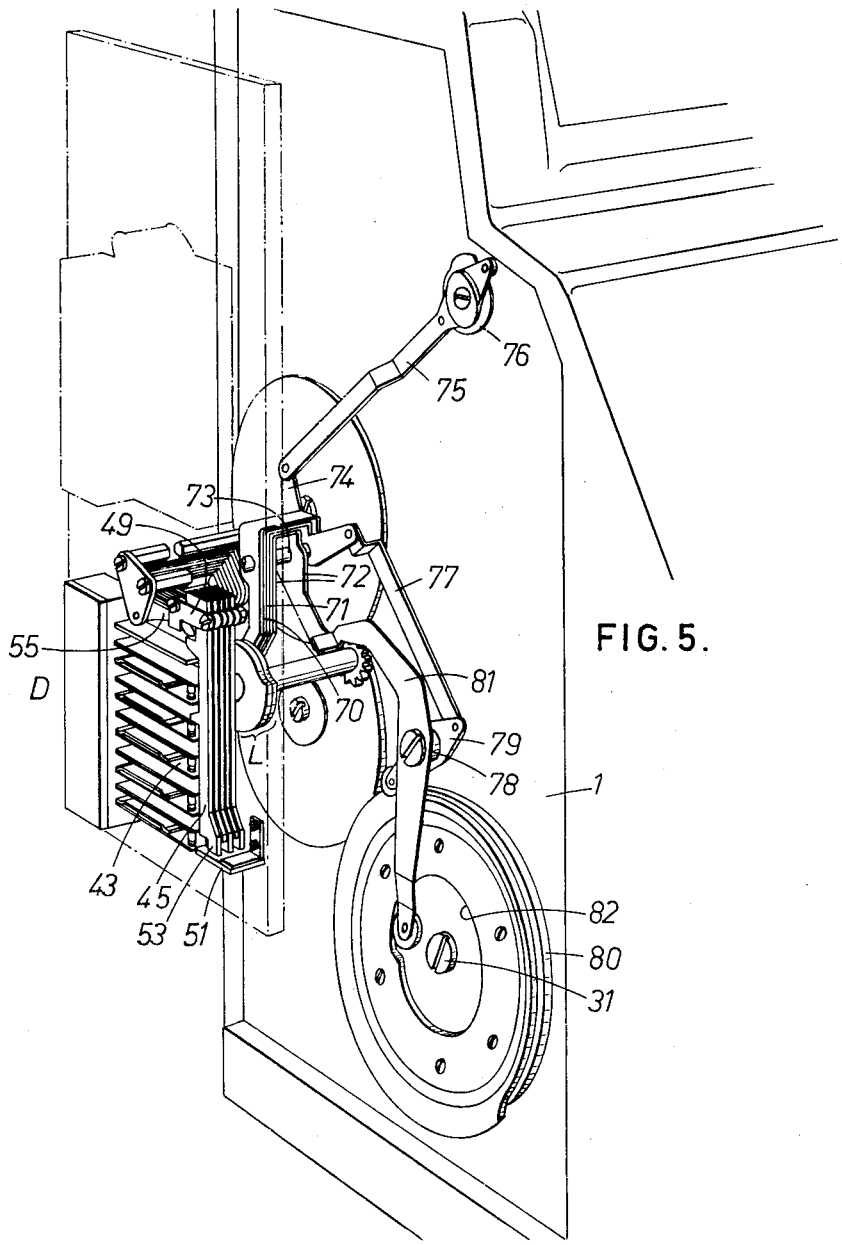
Figure 6:
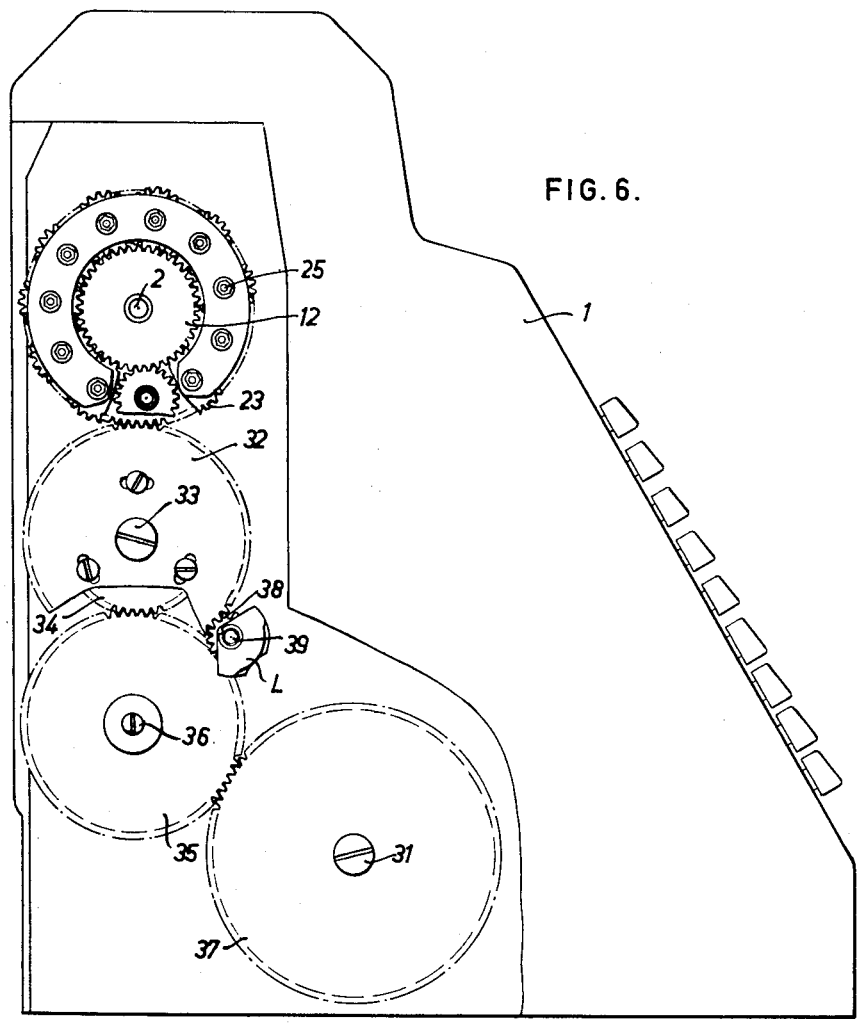

FIG. 1 is a side elevation of the contact system of the data emission device located on the left hand side of a cash register the outlines of which only are indicated.
FIG. 2 is a view, looking from the rear side of the register, of the data emission device with its protecting housing removed as well as with a portion of the casing of the cash register broken away in order to show two parallel telescopic shaft systems of the cash register. FIG. 3 is a perspective sectional view of the data emission mechanism taken along two radial planes at right angles to each other on a highly enlarged scale. FIG. 4 is a perspective view on a still larger scale of a detail of said mechanism. FIG. 5 is a perspective side elevation of the contact groups for transmitting the periodic controlling impulses. FIG. 6 is a side elevation of a transmission between the main shaft of the cash register and the data emitting device.

The mechanism of the cash register is only represented in the drawings by the two parallel telescopic shaft systems shown in FIG. 2, where they are designated by A and B, respectively. As indicated by an arrow the shaft system A transmits motion to the right in FIG. 2, viz. to the data emitting device, whereas the shaft system B transmits motion to the left in said figure, as for instance, to a printing mechanism, not shown. Corresponding shafts of the two systems A and B are set under the control of the main shaft of the machine by means, not shown, such as, for instance, slidable racks the displacements of which are controlled by the depression of keys of the cash register keyboard.

The individual shafts of the shaft system A project through the left hand side wall 1 of the register outside which they end in the manner shown in FIG. 3. In said figure the various shafts are designated by the numerals 2 to 11, the numeral 2 indicating the innermost, or central, shaft, which may be solid or hollow, and 3–11 indicate the surrounding tubular shafts. The ends of shafts 2–11 are each connected, as by welding, to an individual one of a group of toothed wheels designated by the reference numerals 12–21, where that numbered 12 is connected to the central shaft 2 and that numbered 21 is connected to the outermost shaft 11. All of said toothed wheels 12–21 are the same external diameter and all formed with an equal number of teeth.

Outside the left hand side wall of the register the shafts 2 to 11 are mounted in common in a ring 22 attached to said wall. Rotatably mounted on an offset of ring 22 concentric with the shaft system 2–11 is a toothed rim 23. Said toothed rim is rigidly connected with a ring 24 having no teeth, by means of a set of shafts 25 parallel with the central shaft 2, the members 23—25 thus forming a rotatable drum. Said drum includes in the example shown, eleven shafts 25, viz. one shaft for each toothed wheel 12 to 21 and an additional shaft for a purpose to be hereinafter set forth. Rotatably but not slidably mounted on each of the first mentioned ten shafts 25 is a sleeve 26. Each such sleeve carries a toothed wheel 27 in mesh with a corresponding one of the set of toothed whels 12 to 21 and, on its portion next to the ring 24, a group of cams generally designated by K. The individual cams of each such group of cams are adjusted to definite angular positions with relation to each other and sealed in such positions by suitable means, indicated in FIG. 4 as locking discs 28.

As is best seen from FIG. 2, the groups of cams K are located in a region of the drums 23—25 outside of the region occupied by the toothed wheels 12 to 21 and the toothed wheels 27 in mesh therewith. The central shaft 2 of the telescopic shaft system A is extended to and by its outer end mounted in a wall member 29 parallel with the side wall 1 of the register, which is rigidly connected to said side wall by stays 30, FIG. 2, so as to form together with the side wall 1 and said stays a frame for supporting the data delivery means.

The toothed rim 23 of the drum 23—25 is connected to the main shaft 31 of the register, FIG. 6, via a transmission including a toothed wheel 32 in mesh with the toothed rim 23 which is carried by a shaft 33 mounted in the side wall 1 of the register, another toothed wheel 34 keyed to shaft 33, a toothed wheel 35 in mesh with the toothed wheel 34 which is carried by a shaft 36 mounted in wall 1, and a toothed wheel 37 on the main shaft which is in mesh with the toothed wheel 35.

Meshing with the toothed wheel 32 is a pinion 38 which is mounted on a shaft 39 extending between the side wall 1 of the register and the frame wall 29, and the hub of which carries next to said frame wall a group of cams L, in the example shown comprising two cams (FIGS. 2 and 5) the purpose of which will be hereinafter set forth.

Loosely mounted on the outer surface of the frame wall 29 is a plate 40, FIG. 2, carrying on its surface remote from said frame wall two sets of contacts C and D, respectively, insulated from their supporting plate 40 by an insulating layer 41, as for instance, a sheet of fibrous material. Of the said sets of contacts the one designated C is situated above that designated D. Each contact set comprises, in the example shown, five contacts 42 and 43, respectively, as best shown in FIG. 1. Each contact comprises an upper and a lower spring. Normally, the contacts are open and may be closed by depressing their upper springs. Such depression is effected by means of vertically slidable rods 44 and 46, respectively, one for each contact. To this end, said rods are each formed with a lateral projection 46 and 47, respectively, normally resting loosely on the upper spring of the respective contact. The rods are of insulating material. The rods belonging to one and the same set of contacts are situated side by side and are so dimensioned that their total thickness corresponds to the width of a contact spring. The rods of each set are movable vertically independently of each other while guided at their top ends by a strap 48 or 49 common to all rods of the respective set, and engaging by their bottom ends a guide plate 50 or 51, formed with a separate guide-slot for a reduced end portion 52 or 53 of each individual rod of the respective set of rods.

The contact controlling rods may be operated by means of levers 54 or 55, one for each rod. The levers belonging to one and the same set of contacts C or D are mounted to swing independently of each other on a common shaft 56 or 57 and engage by their free ends recesses formed in the adjacent edge of the rods. Each of the shafts 56 and 57 is attached by its one end to a supporting member 58 or 59 situated at a distance in front of the outer surface of the supporting plate 40 or 41 and rigidly connected to the frame wall 29 by means of bolts 60 or 61. The shafts 56 and 57 extend through apertures formed in the supporting plate 40 and its insulating base layer 41 and are connected by their inner ends to a supporting member 62, FIG. 2, bolted to the supporting plate 40. In FIG. 2 is shown the outer supporting member 59 belonging to the lower set of contacts D together with one of its fastening bolts 60 as well as the corresponding inner supporting member 62 and its fastening bolts 63.

The levers 54 and 55, FIG. 1, for operating the contact controlling rods 44, 45 constitute the outer side portions of U-shaped straps the shape of which is best seen in FIG. 3 where the group of straps belonging to the contact operating rods 44 of the upper set of contacts C are shown. The back members 64 of said straps extend parallel with shaft 56 through the same aperture in the supporting plate 40, 41 through which shaft 56 extends. The inner side member of each strap carries a rotatably mounted roller. In FIG. 3 such a roller 66 is shown mounted on the inner side member 65 of the outermost strap 64 by means of a pivot 67. In order not to render the illustration too obscure the ends of the inner side members 65 of the remaining four straps 64 have been cut away. The rollers 66 are located in the planes of movement of the various cams of a group of special cams positioned on the eleventh shaft 25 of the drum 23—25 hereinbefore referred to. The special cams on said shaft 25 have for their object to engage the rollers 66 at the end of each cycle of operation of the register and operate them in a fixed manner to control the emission of a fixed terminating code signal.

The group of straps belonging to the lower set of contacts D carry five rollers two of which, designated 66a and 66b in FIG. 2, are situated right opposite the group of cams L provided on the shaft 39, said group containing in this example but two cams. Said cams have for their object to control the operation of said two rollers 66a and 66B, while the remaining three rollers are controlled by means of levers, shown at 70, 70 and 71, respectively, in FIG. 5. Said levers constitute side members of straps mounted on a common shaft 73. Via a link 77 and a lever 79 pivoted to the wall 1 at 78, the lever 70 is controlled by a cam 80 on the main shaft 31 as and for so called "main shaft control." Similarly, the lever 72 is controlled by a cam 82 on the main shaft 31 via a lever 81 also mounted on the pivot 78, as for instance, for temporarily opening the electric system of the recording apparatus during a predetermined portion of the rotation of the main shaft. The two cams L on shaft 39 control two recurrent signals for controlling the driving of said apparatus. It is to be noted that the circuits controlled by the lower set of contacts D transmit only the recurrent signals which are necessary for the driving of the recording apparatus, while the circuits controlled by the upper set of contacts C have reference to the emission of data signals to the recording apparatus in dependency of the key controlled data settings made in the cash register.

The shafts 2–11, FIG. 3, operate during the cycle of operation of the register following each data setting operation in the cash register to transmit the data set to the respective toothed wheels of the group 12–21 to which the data setting is thus mechanically transmitted. The toothed wheels of the group 12–21 which are operated by this mechanical data delivery course rotate in their turn the respective planet wheels 27 of the sleeves 26 and the associated cam groups K. During the setting operation the drum 23—25 together with the shaft 39 are rotated by transmission of power from the main shaft via the gearing system shown in FIG. 6. During this action the sleeves 26, FIG. 3, together with the cam groups K are rotating around the group of toothed wheels 12–21 in the direction of arrow P, FIG. 3, causing the cam groups K to pass in succession past the rollers 66 on the strap members 65. Those strap members 65 the rollers of which are operated each time a cam group is passing by, are swung downwards, causing the respective strap members 54 to displace the corresponding contact controlling rods 44 downwards to close their respective contacts 42, which will again open as soon as the cam group has passed. While the main shaft 31, FIG. 6, is rotating a revolution, the drum 23—25 makes two revolutions. In the meantime cam 80 of the main shaft 31, FIG. 5, operates via lever 79, link 77 and lever 71 a contact of group D, FIG. 1, so as to hold both contact groups C and D disconnected during the first revolution of drum 23—25, during which the data setting operation is carried out in the cash register. It is thus evident that the elements cooperating with contact groups C and D which are driven from the register main shaft will run freely. Each time a cam group K during the second revolution of drum 23—25 is passing by the rollers 66, a data signal corresponding to the contacts closed during said passage will be emitted to the recording apparatus. During the second revolution of the drum the set of contacts D is also under current so that concurrently with the emission of data signals via the set of contacts C an emission of the recurrent pulses necessary for driving the recording apparatus is going on via the lower set of contacts D.

As already stated hereinbefore, the embodiment of the invention above described and illustrated in the drawings is an example only of the invention and by no means a limitation thereof, the scope of the invention being defined by the appended claims.

I claim:

1. In a system for withdrawing data entered into a cash register or a similar machine and delivering said data as electrical impulses to a recording apparatus concurrently with recurrent power impulses, the combination of an endless series of sets of coding members settable by parallel transmission thereto of data withdrawn from the machine with a single set of feeling members mechanically operable in consecutive order by the individual sets of said series of coding members, electrical channels each having a single contact operable under the control of said feeling members for sequentially emitting the coded signals to the recording apparatus.

2. In a system for withdrawing data entered into a cash register or a similar machine and delivering said data as electrical impulses to a recording apparatus concurrently with recurrent power impulses, the combination of a main driving shaft of the machine, a plurality of parallel shafts combined so as to form a telescopic shaft system, the individual shafts of which are settable by power derived from said main shaft in dependence on data entered into the machine, a toothed gear on each shaft of said telescopic shaft system, a rotatable drum concentrically surrounding said telescopic shaft system and the gears thereon, a circular set of shafts mounted in said drum in directions parallel with the axis of the telescopic shaft system, a toothed wheel on each such parallel shaft in engagement with an individual one of the gears on the telescopic shafts, a set of feeling members in the path of movement of the drum, and means on the parallel shafts of the drum for operating said feeling members in consecutive order during the rotation of the drum.

3. In a system for withdrawing data entered into a cash register or a similar machine and delivering said data as electrical impulses to a recording apparatus concurrently with recurrent power impulses, the combination with means settable by parallel transmission of data thereto for mechanically translating the parallel set of data thus received from the machine into a sequential set while coding said data, a set of feeling members to be operated in order by said sequential set of coded data, contacts operable under the control of said feeling members, electric channels each including an individual one of said contacts for emitting signals under the control of said contacts to the recording apparatus, circuits for imparting power impulses to the recording apparatus, contacts for controlling said circuits and means for operating said contacts, the contacts of said channels being assembled to form a separate group and the contacts of said circuits being assembled to form another separate group.

4. In a system for withdrawing data entered into a cash register or a similar machine and delivering said data as electrical impulses to a recording apparatus concurrently with recurrent power impulses, the combination with a central set of coaxially arranged toothed gears settable by data withdrawn in parallel from the machine, a rotatable drum concentrically surrounding said central set of toothed gears, a circular set of shafts mounted in said drum in directions parallel with the axis of said set of toothed gears, a toothed wheel on each of said parallel shafts in mesh with an individual one of said central toothed gears to be set thereby, cams on each of said parallel shafts for independent rotation therearound, a set of feeling members operable in sequential order by the cams of the parallel shafts for emitting coded data impulses to the recording apparatus, a set of electrical channels for transmitting said coded data impulses, and a single contact in each of said channels, the number of cams on each parallel shaft being equal to the number of data transmitting channels, each individual cam of each shaft corresponding to an individual one of the contacts of said channels.

5. In a system for withdrawing data entered into a cash register or a similar machine and delivering said data as electrical impulses to a recording apparatus concurrently with recurrent power impulses, the combination of an endless series of sets of coding members settable by parallel transmission thereto of data withdrawn from the machine, a single set of feeling members in the shape of levers mechanically operable in order by the sets of said endless series of coding members, electrical channels, a contact in each of said channels, and slidable rods operable by said set of feeling levers for controlling the contacts of said channels as and for the emitting of coded data impulses therethrough to the recording apparatus.

6. In a system for withdrawing data entered into a a cash register or a similar machine and delivering said data as electrical impulses to a recording apparatus concurrently with recurrent power impulses, the combination of an endless series of sets of coding members settable by parallel transmission thereto of data withdrawn from the machine, a single set of feeling members in the shape of levers mechanically operable in order by the sets of said endless series of coding elements, electrical channels, a contact in each of said channels, slidable rods operable by said set of feeling levers for controlling the contacts of said channels as and for the emitting of coded data impulses therethrough to the recording apparatus, said contacts being arranged as a vertical row of pairs of contact springs and the rods to operate them being guided to move in straight paths parallel with said row of contact springs and operable in the direction for closing the contacts by the action of their respective feeling levers and in the direction to open the contacts by spring action.

7. In a system for withdrawing data entered into a cash register or a similar machine and delivering said data as electrical impulses to a recording apparatus concurrently with recurrent power impulses, the combination of means settable by parallel transmission thereto of data withdrawn from the machine for mechanically translating the parallel set of data thus received into a sequential set while coding them, channels each including a single contact for emitting said sequential set to the recording apparatus, circuits each including a single contact for emitting the power impulses to the recording apparatus, means for operating said contacts, a rotary drum for supporting said coding means, a main shaft, and means for positively driving said rotary drum and the last-mentioned contact operating means by power derived from the main shaft with a view of causing operation of the contacts of both groups of contacts during the rotation of the main shaft, the arrangement being such that the drum makes two revolutions upon each revolution of the main shaft, means acting under the control of the main shaft for interrupting the supply of current to both contact groups during the first revolution of the drum, that is to say, during the first half revolution of the main shaft, during which the data setting operations take place in the machine.

8. In a system for withdrawing data entered into a cash register or a similar machine and delivering said data as electrical impulses through contact controlled emission channels to a recording apparatus concurrently with recurrent power impulses, the combination of a main driving shaft, a plurality of parallel shafts combined so as to form a telescopic shaft system, the individual shafts of which are settable by power derived from said main shaft in dependency of data entered into the machine, a toothed gear on each shaft of said telescopic shaft system, a rotatable drum concentrically surrounding said telescopic shaft system and the gears thereon, a circular set of shafts rotatably mounted in said drum parallel with the telescopic shaft system, a toothed wheel on each such shaft in engagement with an individual one of the gears on the telescopic shafts, a set of coding members on each of said shafts, a set of feeling members arranged in the path of movement of said coding members during the rotation of the drum, means operable by said feeling members for controlling the contacts of the data impulse emission channels, and a non-rotary shaft on the drum and means thereon for operating, during each revolution of the drum, said contact controlling means in a predetermined way for special signal emitting purpose.

References Cited in the file of this patent

UNITED STATES PATENTS

| | | |
|---|---|---|
| 2,127,733 | Herbst | Aug. 23, 1938 |
| 2,176,145 | Nelson | Oct. 17, 1939 |
| 2,625,324 | Sundstrand | Jan. 13, 1953 |
| 2,727,685 | Wilson | Dec. 21, 1955 |